US006253702B1

United States Patent
Schoeller, Jr.

(10) Patent No.: US 6,253,702 B1
(45) Date of Patent: Jul. 3, 2001

(54) WIND FIN

(76) Inventor: Richard Schoeller, Jr., 3115 Starboard Dr., Annapolis, MD (US) 21403

( * ) Notice: Subject to any disclaimer, the term of this patent is extended or adjusted under 35 U.S.C. 154(b) by 0 days.

(21) Appl. No.: 09/413,868

(22) Filed: Oct. 7, 1999

(51) Int. Cl.[7] .................................................. B63B 17/00
(52) U.S. Cl. ..................... 114/361; 296/96.11; 296/180.1
(58) Field of Search .................................. 114/343, 361, 114/364; 296/206, 180.1, 180.3, 152, 91, 96.11

(56) References Cited

U.S. PATENT DOCUMENTS

| | | | |
|---|---|---|---|
| Re. 19,044 | * 1/1934 | Nisbet | 296/96.11 |
| 1,498,848 | * 6/1924 | Lillie | 296/96.11 |
| 4,085,665 | 4/1978 | Paxton | 92/2.12 |
| 4,881,484 | 11/1989 | Cavanaugh | 114/361 |
| 4,970,946 | 11/1990 | Ivey | 98/2 |
| 5,259,582 | 11/1993 | DeLange, III | 248/481 |
| 5,855,404 | * 1/1999 | Saunders | 296/78.1 |
| 5,947,052 | * 9/1999 | Deising | 114/361 |

* cited by examiner

Primary Examiner—Stephen Avila
(74) Attorney, Agent, or Firm—Welsh & Flaxman LLC

(57) ABSTRACT

A wind deflector adapted for selective attachment to a support frame is disclosed. The wind deflector includes an elongated fin body having a longitudinal axis, a top side and a bottom side. The bottom side defines a concave arched surface adapted for controlling the flow of air passing thereby. A first mounting clamp and a second mounting clamp are selectively attached to the fin body. Each of the first and second mounting clamps include means for selective attachment to the support frame. The first and second mounting clamps support the fin body for selective rotation about an axis substantially perpendicular to the longitudinal axis of the fin body such that the fin body may be readily secured to support frames with a variety of profiles.

13 Claims, 3 Drawing Sheets

WIND FIN

BACKGROUND OF THE INVENTION

1. Field of the Invention

The invention relates to a wind deflector adapted for use with boats and other semi-enclosed vehicle cockpits. More particularly, the invention relates to a wind deflector including a mounting assembly permitting ready attachment of the wind deflector to a curved windshield, for example, a boat windshield.

2. Description of the Prior Art

The windshield of most power boats lifts the air over the passengers sitting within the passenger compartment. It is, therefore, often desirable to create a flow of air within the passenger compartment of a boat. This is generally accomplished through the use of a wind deflector.

However, wind deflectors are generally difficult to install and do not fit a wide variety of windshields. In fact, a convenient wind deflector, with a mounting system, capable of cooperating with a wide variety of windshields has not yet been devised. With this in mind, a need exists for a convenient and versatile mounting system for installing an adjustable wind deflector on the windshield of a boat, motorcycle, or other semi-enclosed cockpit. The present invention provides such a wind deflector with a versatile mounting system.

SUMMARY OF THE INVENTION

It is, therefore, an object of the present invention to provide a wind deflector adapted for selective attachment to a support frame. The wind deflector includes an elongated fin body having a longitudinal axis, a top side and a bottom side. The bottom side defines a concave arched surface adapted for controlling the flow of air passing thereby. A first mounting clamp and a second mounting clamp are selectively attached to the fin body by way of pivoting elements. Each of the first and second mounting clamps include means for selective attachment to the support frame. The first and second mounting clamps support the fin body and provide for selective rotation about an axis substantially perpendicular to the longitudinal axis of the fin body such that the fin body may be readily secured to support frames with a variety of profiles (i.e. curved or straight).

It is also an object of the present invention to provide a wind deflector wherein the first mounting clamp includes a first pivoting element and the second mounting clamp includes a second pivoting element. The fin body is directly attached to the respective first and second pivoting elements of the first and second mounting clamps.

It is another object of the present invention to provide a wind deflector wherein the first pivoting element of the first mounting clamp may be selectively rotated relative a main body of the first mounting clamp and the second pivoting element of the second mounting clamp may be selectively rotated relative a main body of the second mounting clamp.

It is a further object of the present invention to provide a wind deflector wherein a first bolt secures the first pivoting element to the first mounting clamp and the first bolt selectively controls free rotation of the first pivoting element, and a second bolt secures the second pivoting element to the second mounting clamp and the second bolt selectively controls free rotation of the second pivoting element.

It is a further object to provide an arched surface with a radius selected to produce a more turbulent air flow aft and in close proximity to the fin body.

It is also an object of the present invention to provide a wind deflector wherein the fin body includes a forward main body and an aft edge, the aft edge being selectively coupled to the forward main body to permit adjustment of the wind flow characteristics generated by the present wind deflector.

It is another object of the present invention to provide a wind deflector wherein the aft edge includes an arched bottom side with a radius of curvature greater than that of the arched bottom side of forward main body. This combination of curvatures on the main body and aft edge provides for a more voluminous air flow further aft of the fin body.

It is still a further object of the present invention to provide a wind deflector wherein the aft edge includes a first edge and the forward main body includes a first edge. The first edge of the aft edge and the first edge of the forward main body are configured for mating engagement.

It is also an object of the present invention to provide a wind deflector wherein the fin body is selectively rotatable about an axis substantially parallel to the longitudinal axis of fin body to adjust the volume and direction of air flow generated by the wind deflector.

It is a further object to provide alternative geometries to the contact surfaces of the mounting clamps where they attach to a support frame.

It is still a further object of the present invention to provide a version with a longer fin body installed on longer straight support frames of larger boats and including a mid-point mounting clamp and pivoting element to insure the structural rigidity of the larger fin body while passing larger quanities of air.

Other objects and advantages of the present invention will become apparent from the following detailed description when viewed in conjunction with the accompanying drawings, which set forth certain embodiments of the invention.

BRIEF DESCRIPTION OF THE DRAWINGS

FIG. 4 is a top view of the present wind deflector secured to a straight windshield.

FIG. 5 is a top view of the present wind deflector secured to a curved windshield.

DESCRIPTION OF THE PREFERRED EMBODIMENTS

The detailed embodiment of the present invention is disclosed herein. It should be understood, however, that the disclosed embodiment is merely exemplary of the invention, which may be embodied in various forms. Therefore, the details disclosed herein are not to be interpreted as limited, but merely as the basis for the claims and as a basis for teaching one skilled in the art how to make and/or use the invention.

Figure 1:
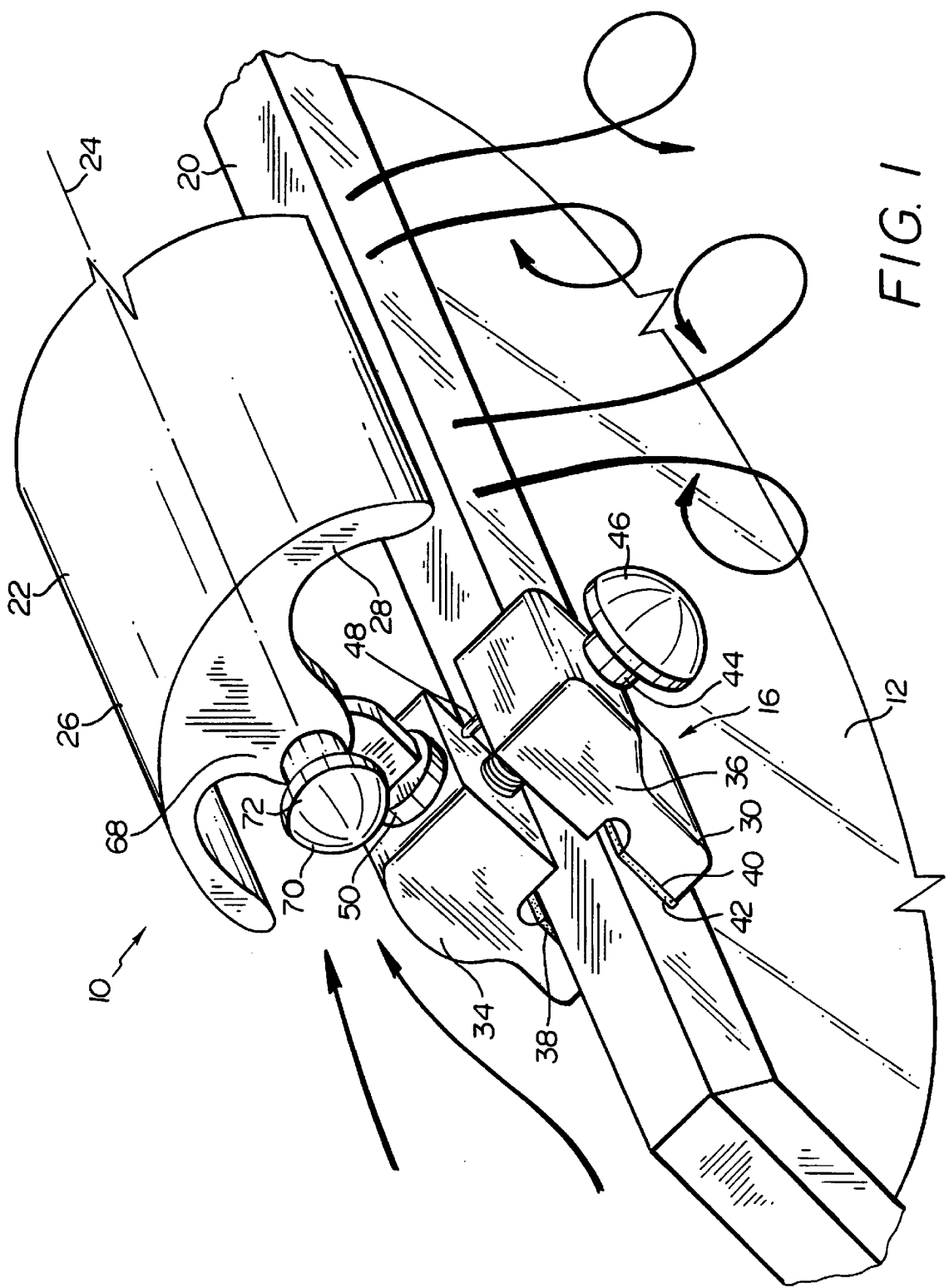
FIG. 1 is a perspective view of the present wind deflector.

With reference to FIG. 1, a wind deflector 10 adapted for selective attachment to the windshield 12 of a conventional boat 14 is disclosed. The wind deflector 10 includes a mounting assembly 16 permitting its selective attachment to a variety of windshields, and other support surfaces, offering various profiles. More particularly, the mounting assembly 16 permits the present wind deflector 10 to be readily attached to windshields having a straight frame assembly, as well as windshields offering a curved frame assembly.

Figure 2:
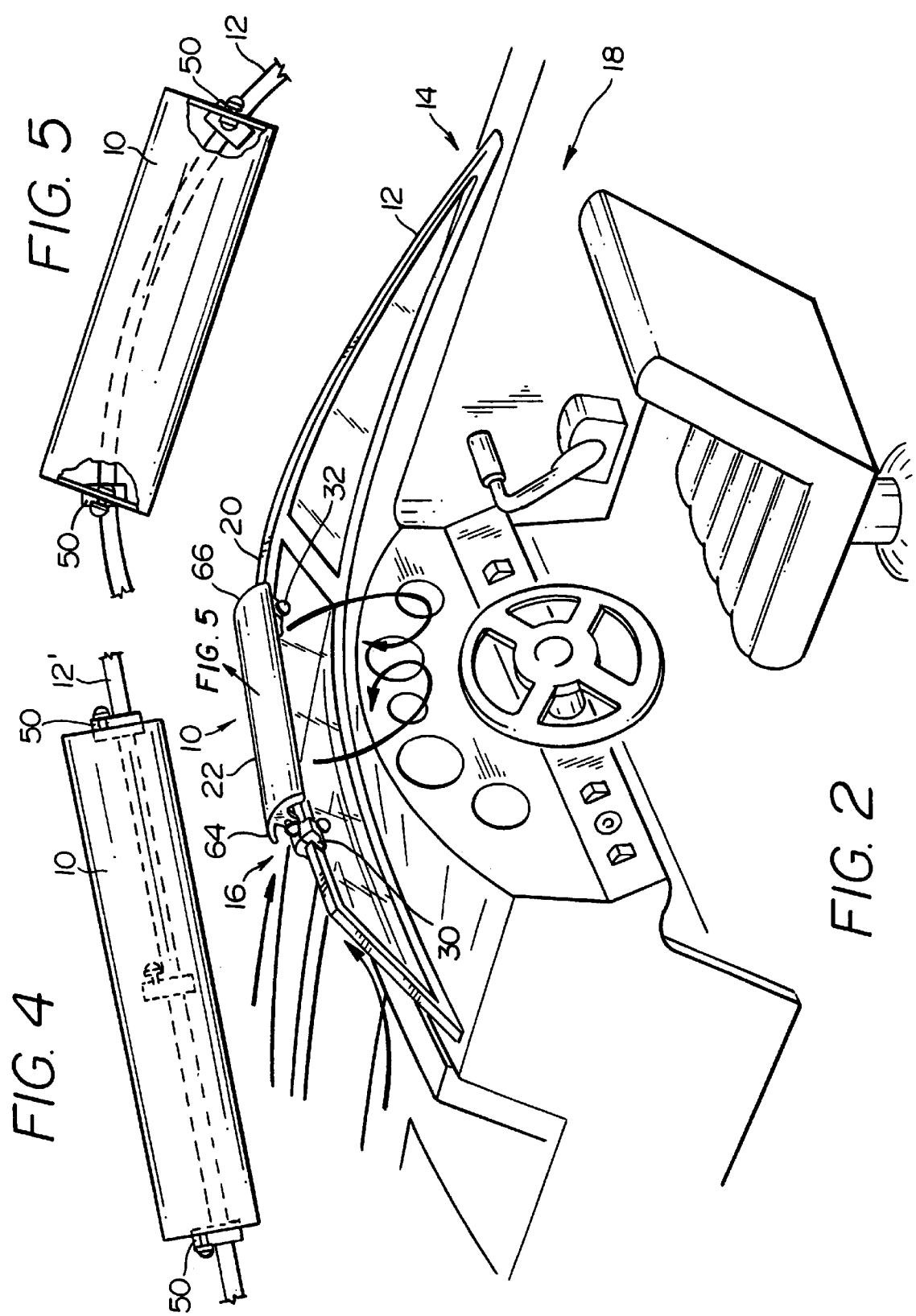
FIG. 2 is a perspective view of the present wind deflector in use.

FIG. 2 shows the cockpit area 18 of a typical medium or high speed power boat 14 with a wind deflector 10 in accordance with the present invention installed. The cockpit area 18 is shown to include a typical curved windshield 12. The turbulent air flow is also shown.

In use, the wind deflector 10 is attached directly to the windshield frame 20 such that the wind deflector 10 captures both the direct, in flow of air resulting from the forward motion of a boat and the air being deflected upwardly from the windshield 12. The air captured by the wind deflector 10 is directed aft and downward, providing a pleasant turbulent wash of air to the occupants of the boat sitting aft or behind the windshield 12. In practice, it is contemplated that wind deflectors 10 will be on the forward top edge of the port and starboard windshields.

The wind deflector 10 in accordance with the present invention includes an elongated fin body 22 having a longitudinal axis 24, a top side 26 and a bottom side 28. The bottom side 28 defines a concave arched surface while the top side 26 defines a convex arched surface substantially corresponding to the surface defined by the bottom side 28. The fin body 22 is preferably an aluminum or plastic extrusion, although the fin body 22 may be manufactured from a variety of materials using various techniques without departing from the spirit of the present invention.

As briefly discussed above, the present wind deflector 10 includes a mounting assembly 16 which readily attaches the fin body to windshields having various profiles. The mounting assembly 16 includes a first mounting clamp 30 and a second mounting clamp 32 selectively attached to the fin body 22.

The mounting clamps 30, 32 are substantially identical and will be described with reference to the first mounting clamp 30 shown in FIG. 1. The first mounting clamp 30 includes a first clamp member 34 and a second clamp member 36. The first and second clamp members 34, 36 respectively include mating gripping surfaces 38, 40 shaped and dimensioned for engagement with the frame of a boat windshield. The mating gripping surfaces 38, 40 are fitted with synthetic, rubber-like cushioning pads 42 to provide firm attachment of the clamps 30, 32 to the windshield 12 and to avoid marring the windshield frame 20 to which they are attached.

A tightening bolt 44 links the first and second clamp members 34, 36 such that they may be selectively moved relative to each other. The tightening bolt 44 includes a hand tightening knob 46 of generous proportions which is well rounded to prevent contact injuries should someone fall against it during boat maneuvering operations or rough seas. The tightening bolt 44 is sufficiently long to permit attachment of the mounting clamp 30 on a wide variety of boat windshield frames. It is further contemplated that an alignment pin 48 may be used to ensure proper alignment of the first clamp member 34 and second clamp member 36 while they are being attached to the windshield frame 20.

The first clamp member 34 includes a pivoting element 50 adapted for direct attachment to the fin body 22 in a manner which will be discussed below in greater detail. With reference to the embodiment disclosed in FIG. 3, the pivoting element 50' is pivotally supported within the body 52' of the first clamp member 34'. Specifically, the pivoting element 50' includes a bolt 54' which extends through the body 52' of the first clamp member 34'. The distal end 56' of the bolt 54' is screwed into the main body 58' of the pivoting element 50' such that the pivoting element 50' may be selectively locked in position relative to the body 52' of the first clamp member 34'. Secure engagement between the body 52' of the first clamp member 34' and the pivoting element 50' is ensured by providing radial grooves (not shown) on the interlocking surfaces of both the pivoting element 50' and the body 52' of the first clamp member 34'.

The pivoting element 50' includes an aperture 60' for alignment with either aperture 62 formed at the first and second ends 64, 66 of the fin body 22. Specifically, the fin body 22 is formed with downwardly extending coupling flanges 68, with coupling apertures 62, at its first and second ends 64, 66. The downwardly extending flanges 68 are shaped and dimensioned for engagement with the apertures 60' of the pivoting elements 50' found on the first and second mounting clamps 30, 32.

Returning to the embodiment disclosed in FIG. 1, a coupling bolt 70 connects the pivoting element 50 to the fin body 22. Specifically, the coupling bolt 70 is passed through the aperture 62 (see FIG. 3) in the coupling flange 68 of the fin body 22 and screwed into the aperture 60' (see FIG. 3) of the pivoting element 50. With this in mind, the aperture of the pivoting element is formed with female threads (not shown) adapted to receive and engage the threads of the coupling bolt 70. The fin body 22 may, therefore, be selectively rotated by simply loosening the coupling bolt 70 in a manner permitting selective rotation of the fin body 22. Once the fin body's orientation is properly set, the coupling bolt 70 is tightened until the fin body 22 is locked in position. As with the tightening bolt 44 discussed previously, the coupling bolt 70 is formed with a large, round hand tightening knob 72. Similarly, the facing surfaces of the coupling flange 68 and the pivoting element 50 may be formed with radial grooves (not shown) to ensure secure engagement between the elements.

The orientation of the pivoting element relative to the fin body ensures that the fin body may be readily and selectively rotated about an axis substantially perpendicular to the longitudinal axis of the fin body. In this way, the fin body may be readily secured to support frames having a variety of profiles.

Referring to FIGS. 4 and 5, the versatility of the present wind deflector 10 in facilitating attachment to windshields having a variety of profiles is shown. Specifically, FIG. 4 shows the wind deflector 10 attached to a substantially straight windshield 12', while FIG. 5 shows the pivoting elements 50 slightly rotated to facilitate attachment of the wind deflector 10 to a curved windshield 12.

As discussed above, the fin body 22 produces turbulent multidirectional airflow as a result of its high arched wind deflector design. The arched fin body 22 is comprised of 5 to 6½ inches of circular perimeter length from a curved section of material formed on a diameter of 2 to 4½ inches. The forward and aft edge of the wind deflector are fabricated with an edge radius of at least ⅛ inch to avoid edge tone acoustic disturbances. This also avoids contact injuries to occupants of the boat. The wind deflector fin body diameter and fin perimeter length are selected in combination to create an arched geometry conducive to the creation of turbulent air flow immediately downstream of the fin body.

Figure 3:
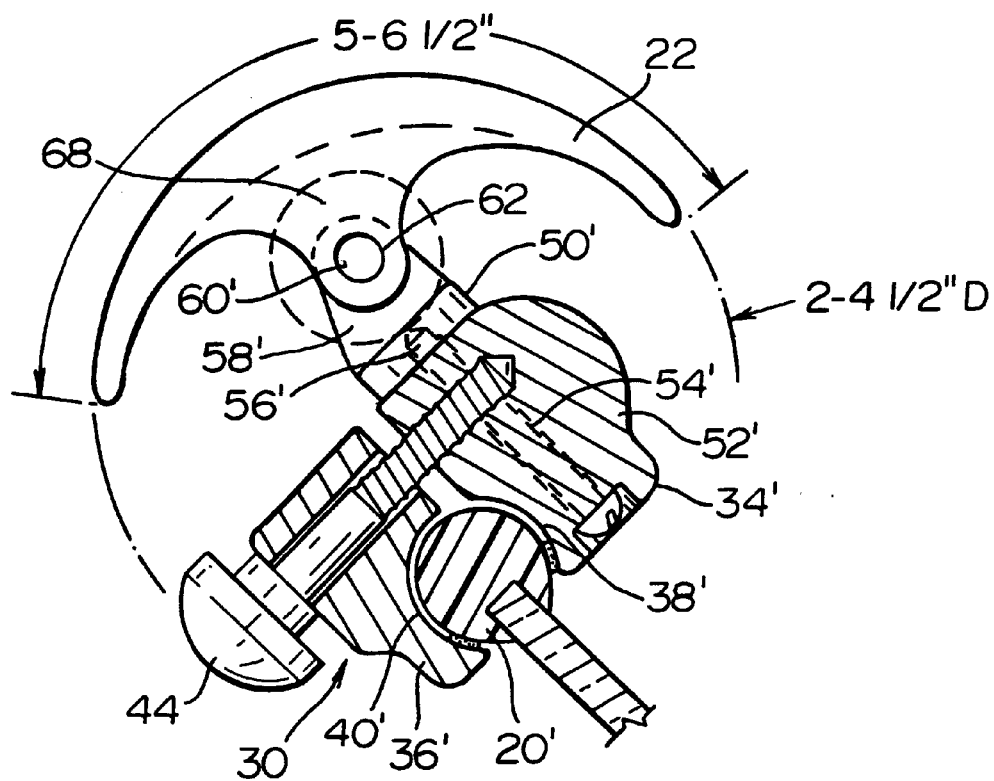
FIG. 3 is a cross-sectional view of an alternate embodiment of the present wind deflector.

With reference to FIG. 3 an alternate mounting clamp 30' is disclosed. The alternate clamp 30' is substantially similar to the mounting clamp 34 previously discussed with reference to FIG. 1, but is designed for attachment to windshields having a circular frame 20'. As such, the first and second clamp members 34', 36' of the mounting clamp 30' are formed with mating gripping surfaces 38', 40' which are opposed concave recesses adapted to engage the curved frame 20' of such windshields. The particular windshield frame brackets shown in FIG. 3 provide at least four contact points permitting firm attachment of the mounting clamp 30' to the windshield frame 20'. This avoids relative motion between the windshield mounting clamps and the windshield frame that can result from wind forces on the wind deflector.

Figure 6:
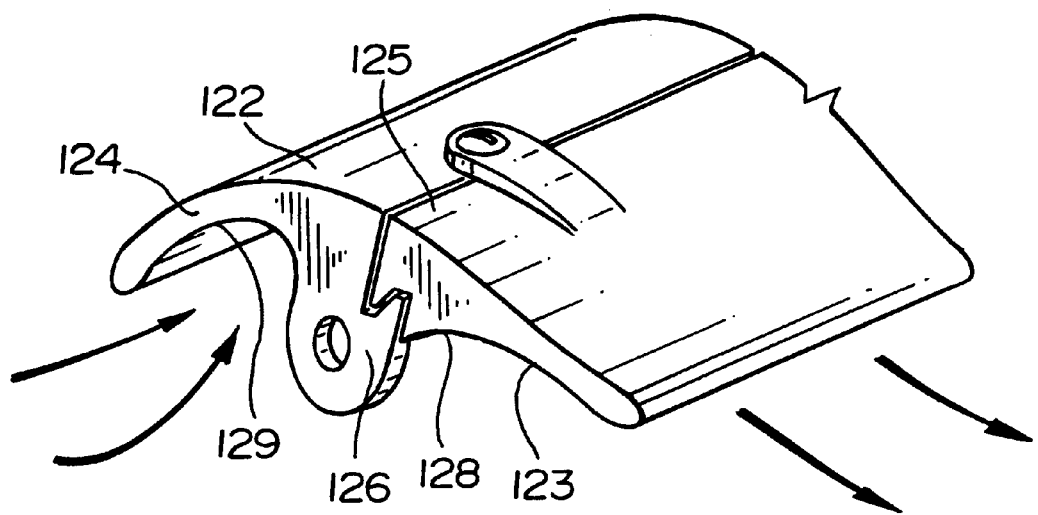
FIG. 6 is a perspective view of an alternate two piece fin body.

With reference to FIG. 6, an alternate fin body 122 is disclosed. The alternate fin body 122 is designed to provide for ventilating, cooling air flow to occupants in larger boats where passengers normally sit at a considerable distance from the boat windshield. In such applications, the more direct, non-turbulent air flow coming from the disclosed fin body design mixes with the larger volume of air between the windshield and the boat occupants on larger boats. The desired air flow is achieved by providing an aft edge 123 with a more moderate curvature than that of the main fin body. That is, the arched bottom side 128 of the aft edge 123 has a larger radius of curvature than the radius of curvature for the arched bottom side 129 of the main fin body 124. This design produces an air flow which does not create the rapid air turbulence of the fin body disclosed in FIGS. 1 or 3.

As shown in FIG. 6, the aft edge 123 may be selectively coupled to the main fin body 124. Briefly, the aft edge 123 is provided with a profiled edge 125 adapted for mating engagement with the profiled edge 126 of the main fin body 124. Once engaged, the main fin body 124 and the aft edge 123 are securely fastened together. The modular construction shown in FIG. 6 allows the shape of the fin body to be readily adjusted to meet specific needs.

As a result, the air flow provided by the fin body 122 disclosed in FIG. 6 is directed further aft in the vessel, eventually mixing with the larger air volume between the windshield and the occupant sitting behind the windshield.

While the preferred embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. A wind deflector adapted for selective attachment to a support frame, comprising:
   an elongated fin body having a longitudinal axis, a top side and a bottom side, the bottom side defines a concave arched surface;
   a first mounting clamp and a second mounting clamp selectively attached to the fin body, each of the first and second mounting clamps include means for selective attachment to the support frame, wherein the first and second mounting clamps support the fin body for selective rotation about an axis substantially perpendicular to the longitudinal axis of the fin body such that the fin body may be readily secured to a support frame having a variety of profiles; and wherein the first mounting clamp includes a first pivoting element and the second mounting clamp includes a second pivoting element, and the fin body is directly attached to the respective first and second pivoting elements of the first and second mounting clamps to selectively pivot thereabout.

2. The wind deflector according to claim 1, wherein the first pivoting element of the first mounting clamp may be selectively rotated relative to a main body of the first mounting clamp and the second pivoting element of the second mounting clamp may be selectively rotated relative to a main body of the second mounting clamp.

3. The wind deflector according to claim 1, wherein a first bolt secures the first pivoting element to the first mounting clamp and the first bolt selectively controls free rotation of the first pivoting element and a second bolt secures the second pivoting element to the second mounting clamp and the second bolt selectively controls free rotation of the second pivoting element.

4. The wind deflector according to claim 1, wherein the fin body includes a forward main body and an aft edge, the aft edge being selectively coupled to the forward main body to permit adjustment of the wind flow characteristics generated by the present wind deflector.

5. The wind deflector according to claim 4, wherein the aft edge has an arched bottom side with a radius of curvature which is greater than that of an arched bottom side of the forward main body.

6. The wind deflector according to claim 4, wherein the aft edge includes a first edge and the forward main body includes a first edge, wherein the first edge of the aft edge and the first edge of the forward main body are configured for mating engagement.

7. The wind deflector according to claim 4, wherein the fin body is selectively rotatable about an axis substantially parallel to the longitudinal axis of the fin body to adjust the flow of air generated by the fin body.

8. The wind deflector according to claim 1, wherein the fin body is selectively rotatable about an axis substantially parallel to the longitudinal axis of fin body to adjust the flow of air generated by the fin body.

9. The wind deflector according to claim 1, wherein the fin body diameter and fin perimeter length are selected in combination to create an arched geometry conducive to the creation of turbulent air flow immediately downstream of the fin body.

10. A wind deflector adapted for selective attachment to a support frame, comprising:
    an elongated fin body having a longitudinal axis, a top side and a bottom side, the bottom side defines a concave arched surface, wherein the fin body includes a forward main body and an aft edge, the aft edge being selectively coupled to the forward main body to permit adjustment of the wind flow characteristics generated by the present wind deflector; and wherein the aft edge includes a first edge and the forward main body includes a first edge, wherein the first edge of the aft edge and the first edge of the forward main body are configured for mating engagement.

11. The wind deflector according to claim 10, wherein the aft edge has an arched bottom side with a radius of curvature which is greater than that of an arched bottom side of the forward main body.

12. The wind deflector according to claim 10, wherein the fin body diameter and fin perimeter length are selected in combination to create an arched geometry conducive to the creation of turbulent air flow immediately downstream of the fin body.

13. A wind deflector adapted for selective attachment to a support frame, comprising:

an elongated fin body having a longitudinal axis, a top side and a bottom side, the bottom side defines a concave arched surface;

a first mounting clamp and a second mounting clamp selectively attached to the fin body, each of the first and second mounting clamps include means for selective attachment to the support frame, wherein the first and second mounting clamps support the fin body for selective rotation about an axis substantially perpendicular to the longitudinal axis of the fin body such that the fin body may be readily secured to a support frame having a variety of profiles;

wherein the fin body includes a forward main body and an aft edge, the aft edge being selectively coupled to the forward main body to permit adjustment of the wind flow characteristics generated by the present wind deflector; and wherein the aft edge includes a first edge and the forward main body includes a first edge, wherein the first edge of the aft edge and the first edge of the forward main body are configured for mating engagement.

* * * * *